United States Patent
Forster

(10) Patent No.: US 8,068,031 B2
(45) Date of Patent: Nov. 29, 2011

(54) RFID DEVICES AND METHODS FOR OVERLAPPED OBJECTS

(75) Inventor: Ian J. Forster, Essex (GB)

(73) Assignee: Avery Dennison Corporation, Pasadena, CA (US)

( * ) Notice: Subject to any disclaimer, the term of this patent is extended or adjusted under 35 U.S.C. 154(b) by 639 days.

(21) Appl. No.: 12/028,069

(22) Filed: Feb. 8, 2008

(65) Prior Publication Data

US 2009/0201157 A1  Aug. 13, 2009

(51) Int. Cl.
G08B 13/14 (2006.01)
(52) U.S. Cl. .................. 340/572.7; 340/539.1; 340/10.2
(58) Field of Classification Search ............... 340/572.7, 340/572.1–572.6, 572.8–572.9, 568.1, 539.1, 340/10.2, 10.3
See application file for complete search history.

(56) References Cited

U.S. PATENT DOCUMENTS

| | | | |
|---|---|---|---|
| 6,946,950 B1 * | 9/2005 | Ueno et al. ................... 340/10.1 |
| 7,047,677 B2 * | 5/2006 | Rambaldi .................... 40/124.2 |
| 7,059,518 B2 | 6/2006 | Forster | |
| 7,213,807 B2 * | 5/2007 | Blanchard et al. ......... 270/58.32 |
| 7,268,687 B2 * | 9/2007 | Egbert et al. ............... 340/572.7 |
| 7,273,173 B2 | 9/2007 | Forster | |
| 7,298,343 B2 | 11/2007 | Forster et al. | |
| 7,339,523 B2 * | 3/2008 | Bye ............................... 342/451 |
| 7,633,378 B2 * | 12/2009 | Rodgers et al. ............. 340/10.5 |
| 2002/0196126 A1 * | 12/2002 | Eisenberg et al. .......... 340/10.2 |
| 2003/0136503 A1 | 7/2003 | Green et al. | |
| 2004/0217867 A1 * | 11/2004 | Bridgelall et al. ......... 340/572.8 |
| 2006/0086809 A1 * | 4/2006 | Shanks et al. ................ 235/492 |
| 2006/0114103 A1 * | 6/2006 | Usami .......................... 340/10.2 |
| 2007/0216534 A1 | 9/2007 | Ferguson et al. | |

FOREIGN PATENT DOCUMENTS

| | | |
|---|---|---|
| EP | 0 997 842 | 5/2000 |
| EP | 1 370 007 | 12/2003 |
| JP | 2000-222542 | 8/2000 |
| JP | 2001-319202 | 11/2001 |
| WO | 0103058 | 1/2001 |

OTHER PUBLICATIONS

Capps, Charles, "Near field or far field?", EDN, (2001), <www.ednmag.com>.
Invitation to Pay Additional Fees and Partial International Search issued in corresponding PCT/US2009/032790 dated May 28, 2009.
International Search Report and Written Opinion of the International Searching Authority issued in PCT/US2009/032790 dated Sep. 2, 2009.

* cited by examiner

*Primary Examiner* — Daniel Previl

(57) ABSTRACT

Readability of overlapping radio frequency identification (RFID) devices on overlapping objects, such as RFID labels on stacked garments, is improved by having different antenna configurations for the overlapped RFID devices. Each pair of closest overlapped RFID devices may have different respective antenna configurations. The different respective antenna configurations may be mirror images of one another, or may have the same shape, with a relative rotation between the two. The different antenna configurations may substantially fill an antenna-receiving portion that is located in the same relative location in each of the RFID devices, with the antenna-receiving portion covering most of an area of the RFID devices. Feedpoints of the different antenna configurations, for receiving a strap or interposer for coupling to the antenna configurations, may be in the same relative location.

20 Claims, 3 Drawing Sheets

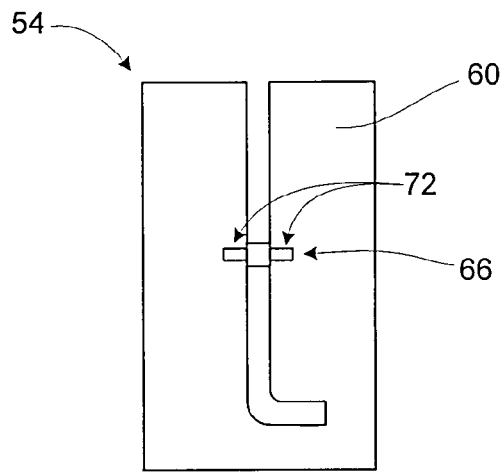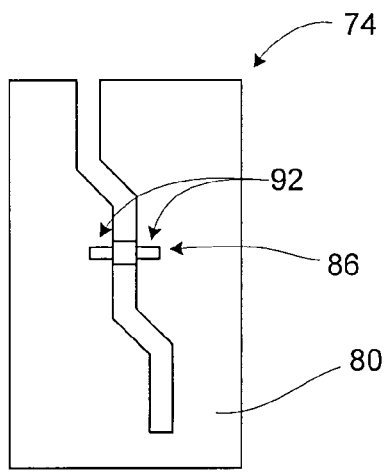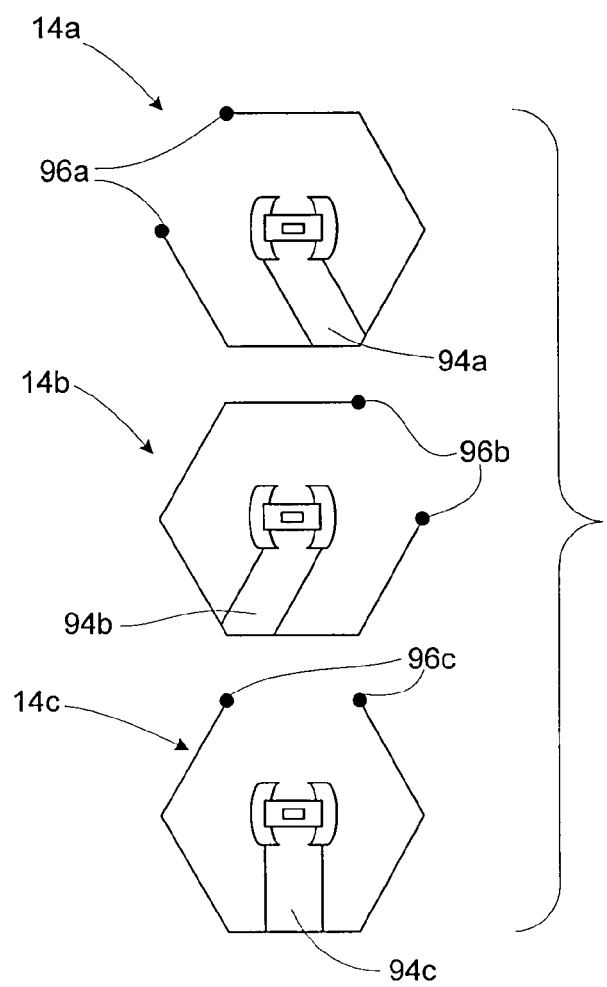

RFID DEVICES AND METHODS FOR OVERLAPPED OBJECTS

BACKGROUND OF THE INVENTION

1. Field of the Invention

The invention is in the field of radio frequency identification (RFID) devices.

2. Description of the Related Art

Radio frequency identification (RFID) tags and labels (collectively referred to herein as "devices") are widely used to associate an object with an identification code or other information. For example, RFID tags are used in conjunction with security locks in cars, for access control to buildings, and for tracking inventory and parcels. RFID devices generally have a combination of antennas and analog and/or digital electronics, which may include for example communications electronics, data memory, and control logic.

As noted above, RFID devices are generally categorized as labels or tags. RFID labels are RFID devices that are adhesively or otherwise have a surface attached directly to objects. RFID tags, in contrast, are secured to objects by other means, for example by use of a plastic fastener, string or other fastening means.

One possible concern in using RFID devices is that devices may undesirably interact with one another when the devices are close together. It will be appreciated that reducing or eliminating such effects may be desirable.

SUMMARY OF THE INVENTION

According to an aspect of the invention, different overlapping radio frequency identification (RFID) devices on overlapping objects have different antenna configurations. The different antenna configurations reduce near field interactions between the RFID devices while maintaining the far field readability of the RFID devices.

According to another aspect of the invention, a method of identifying a plurality of objects includes the steps of: placing respective RFID devices on the objects; and aligning the objects in an overlapping configuration. The aligning causes the RFID devices to overlap each other. Adjacent of the overlapped RFID devices have different antenna configurations from one another.

According to yet another aspect of the invention, an RFID device web or sheet includes multiple RFID devices. Each of the RFID devices has an antenna-receiving position at the same relative antenna location. Adjacent of the RFID devices include different antenna configurations that each substantially fill the antenna-receiving positions.

According to still another aspect of the invention, a grouping of objects includes multiple of the objects that overlap one another. The objects have respective radio frequency identification (RFID) devices mechanically coupled to them. The RFID devices overlap one another. At least some of the RFID devices have different antenna configurations than other of the RFID devices.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale:

FIG. 7 is a plan view of another possible antenna configuration for one of the RFID devices on the objects of the stack of FIG. 1;

FIG. 8 is a plan view of still another possible antenna configuration for one of the RFID devices on the objects of the stack of FIG. 1;

FIG. 9 schematically illustrates magnetic and electric field positions for various RFID devices for overlapped devices in accordance with an embodiment of the invention;

DETAILED DESCRIPTION

Readability of overlapping radio frequency identification (RFID) devices on overlapping objects, such as RFID labels on stacked garments, is improved by having different antenna configurations for the overlapped RFID devices. Each pair of closest or adjacent overlapped RFID devices may have different respective antenna configurations. The different respective antenna configurations may be mirror images of one another, or may have the same shape, with a relative rotation between the two. The different antenna configurations may substantially fill an antenna-receiving portion that is located in the same relative location in each of the RFID devices, with the antenna-receiving portion covering most of an area of the RFID devices. Feedpoints of the different antenna configurations, for receiving a strap or interposer for coupling to the antenna configurations, may be in the same relative location. The antenna configurations may be loop-slot configurations or other suitable configurations. By varying the antenna configurations of the RFID devices communication with the RFID devices is enhanced in that the devices interfere less with one another.

Figure 1:
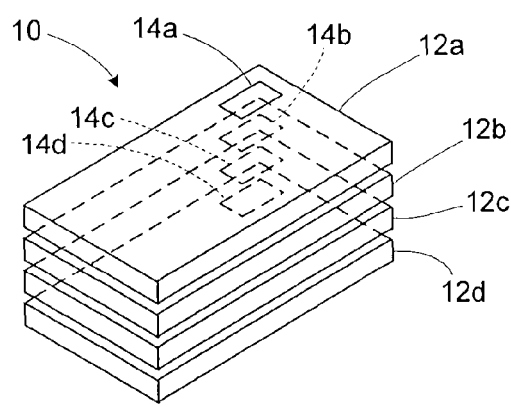
FIG. 1 is an orthogonal view of a stack of overlapping objects with overlapping RFID devices, in accordance with an embodiment of the invention.
Figure 2:
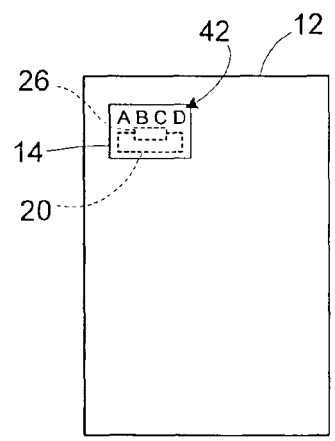
FIG. 2 is a plan view of one of the objects of the stack of FIG. 1.
Figure 3:
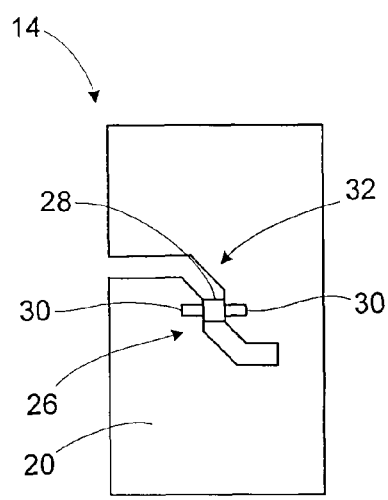
FIG. 3 is a plan view of part of one of the RFID devices on the objects of the stack of FIG. 1.
Figure 4:
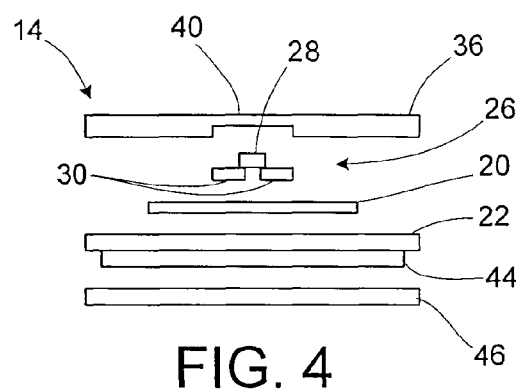
FIG. 4 is an exploded sectional view of the RFID device of FIG. 3.

FIG. 1 shows a stack 10 of objects 12a-12d having respective radio frequency identification (RFID) devices 14a-14d thereupon. FIG. 2 shows a single object 12, one of the objects 12a-12d, with its RFID device 14, one of the RFID devices 14a-14d. FIGS. 3 and 4 show further details regarding the RFID device 14. The objects 12a-12d may be any of a wide variety of objects, examples being garments of various types, packages, and containers. The objects 12a-12d all may be substantially identical in size and shape. The objects 12a-12d form the stack 10 in the sense that the objects 12a-12d overlap one another, such as with the objects 12a-12d aligned with one another so that the objects 12a-12d substantially totally overlap one another. "Overlap," as the term is used herein, refers to one of the objects 12a-12d being above or below another of the other objects 12a-12d, in a space defined by a perpendicular projection of a major surface of the overall shape of individual of the objects 12a-12d. More particularly, overlapping may refer to covering at least part of a major surface. For example, different sized items can overlap one another but the RFID device of the respective items still overlap one another. The term "stacked" is used herein to refer to a situation where substantially-identically-sized items are overlapped in substantial alignment or where they are stacked and the RFID devices of the items overlap one another. Although the objects 12a-12d are shown overlapped and stacked vertically, it will be appreciated that overlapping and stacking, as the terms are used here, may be horizontal or in any other direction, or slightly splayed out of alignment of a stack or overlapping configuration.

In an exemplary embodiment, the RFID devices 14a-14d may be labels or tags, and may be substantially identical in size and shape to one another. The RFID devices 14a-14d are mechanically coupled to the objects 12a-12d at respective locations 16a-16d on or in the objects 12a-12d. The locations 16a-16d may all be substantially the same relative locations on the objects 12a-12b. That is, the locations 16a-16d may be substantially the same relative to some common reference location on the objects 12a-12d, such as corners of the objects 12a-12d, or centers or centers of surfaces of the objects 12a-12d. It should be understood that the locations 16a-16d may also vary on an item but that the devices 14a-14d would still overlap one another in the stack. Thus with the objects 12a-12d overlapped and aligned with one another (stacked), the RFID devices 14a-14d also may be substantially fully overlapped and aligned with one another. As explained in greater detail below, some of the RFID devices 14a-14d will have different configurations from other of the RFID devices 14a-14d, allowing them to have better performance when overlapped in the stack 10 of overlapping objects 12a-12d.

FIG. 4 shows one possible configuration of the layers of the RFID device 14. The layers shown are that of an RFID label, but it will be appreciated that other layer and tag configurations are possible. The RFID device 14 has an antenna configuration 20 on a substrate 22. The substrate 22 may be any of a wide variety of suitable materials for receiving the antenna configurations, such as suitable polymer materials and paper. The antenna configuration 20 may be any of a wide variety of known antenna configurations. A slot-loop configuration, such as illustrated in FIG. 3, is one possible configuration for the RFID device's antenna. Other possible configurations include loop antennas, dipole antennas, slot antennas, and combinations of the foregoing types.

The antenna configurations 20 of different of the RFID devices 14a-14d may be at the same relative location on the RFID devices 14a-14d. The antenna configurations 20 of different of the RFID devices 14a-14d may substantially fill the antenna-receiving positions of the devices 14a-14d.

An interposer or strap 26 includes a chip or integrated circuit 28 and conductive leads 30. The conductive leads 30 are electrically coupled to the chip 28, such as through conductive contacts on the bottom of the chip 28. The conductive leads 30 are used to electrically couple the chip 28 to the antenna configuration 20 at feedpoints 32 of the antenna configuration 20. The electrical coupling may be by a direct electrically-conductive path between the chip 28 and the antenna configuration 22. Alternatively, part of the electrical connection may involve indirect coupling, such as by capacitive coupling or magnetic coupling (or a combination of both magnetic and capacitive coupling). The interposer or strap 26 may have additional structures, for example having an interposer substrate that supports the conductive leads 30. The interposer 26 may be attached to the antenna configuration 20 by use of a suitable conductive or non-conductive adhesive. The attachment may be in a face-up mode, with the chip 28 away from the antenna configuration 20, as is illustrated in FIG. 4. Alternatively the interposer 26 may be attached in a face-down configuration, with the chip 28 attached to the surfaces of the conductive leads 30 that face the antenna configuration 20.

A printable covering layer 36 overlies the interposer 26 and the antenna configuration 20. The covering layer may have a thinned portion 40 located where the covering layer 36 overlies the interposer 26. The thinned portion 40 may be formed by skiving a material of the covering layer 36 to remove material and thus to reduce thickness. Alternatively, the thinned portion 40 may be formed by locally pressing the material of the covering layer 36, calendaring the material to reduce its thickness. The covering layer 36 may be many of a printable material, such as paper. The interposer 26 may be located on the RFID device 14 such that the interposer 26 is located away from the area of the covering layer 36 where the covering layer 36 is to be printed. This is illustrated in FIG. 2, which shows printed matter 42 located away and not overlying from the interposer 26 of the RFID device 14. It will be appreciated that other layers and/or coatings may be added above or below the covering layer 36. For example coatings or additional layers may be used to prevent water or other contaminants from reaching the antenna 20 and the interposer 26. The covering layer 36 may be attached to the substrate 22 by use of an adhesive or other suitable attachment mechanisms.

A bottom surface of the substrate 22 is covered with an adhesive layer 44. A release layer 46 is used to cover the adhesive layer 44 prior to use of the RFID device 10. The adhesive 44 may be many of a suitable variety of adhesives, such as pressure sensitive adhesives, temperature-activated adhesives, or rewettable adhesives. The release layer 46 may be removed prior to adhering the RFID device 14 to the object 12.

At least some of the RFID devices 14a-14d have different antenna configurations than other of the RFID devices. This is done to reduce the near-field interaction between the overlapping RFID devices 14a-14d. Since the RFID devices 14a-14d overlap one another in the stack 10, the RFID devices 14a-14d interact with one another in the near field. If all of the RFID devices 14a-14d were identical, the near field interactions between the devices 14a-14d would be relatively strong. This near field interaction between the devices 14a-14d may be reduced by shifting the relative locations of the points of high magnetic and electric field on the antenna configurations 20 of some of the RFID devices 14a-14d. In doing so it is desirable to maintain similar (or at least acceptable) far field performance for all of the RFID devices 14a-14d. In addition it is desirable to have a common mounting location for placing the interposer 26 for each of the RFID devices 14a-14d. Having a common mounting location facilitates manufacture of the RFID devices 14a-14d, and provides a consistent relative location for the thinned covering layer portion 40, or for any bump or other irregularity in the RFID devices 14a-14d caused by the presence of the devices interposer or strap 26.

The term "far field" is used in contrast to the "near field" that is closer to antenna. Both terms describe the fields around an antenna (or any other electromagnetic radiation source). In a three region model, the far field is where the dominant terms in Maxwell's equation are those proportional to 1/r, where r is the distance from the antenna (or other radiation source). The near field encompasses a reactive field or Fresnel zone, where the dominant terms are proportional to $1/r^3$, and a near radiation field or transition zone, where the dominant terms are proportional to $1/r^2$. The boundary between the near field and the far field is often taken to be (and may be considered herein as) a distance from the antenna equal to $\lambda/2\pi$, where $\lambda$ is the wavelength of the radiation being emitted by the antenna. Further details regarding the boundary between the near field and the far field may be found in Capps, Charles, "Near field or far field?," EDN, Aug. 16, 2001, available at www.edn.com/contents/images/150828.pdf.

"Proximity coupling" or "proximity field coupling" occurs at a range that goes beyond near field coupling, beyond the reactive near field and the radiating near field to include a farther region in which sufficient energy may be transferred to operate tags via a distributed read structure. As noted above, the boundary between the near field and the far field is often taken to be a distance from the antenna equal to $\lambda/2\pi$, where $\lambda$ is the wavelength of the radiation being emitted by the antenna. However it should be realized that sufficient energy is available to operate a RFID device designed to couple via magnetic or electric field coupling at ranges much greater than this depending on the distributed antenna design and power input via the coupler. It is commonly understood that the region where powering via a primarily single field component, retaining the advantageous characteristics of near field coupling, is possible out to approximately 1 wavelength away from the read system. Therefore proximity coupling may be defined as extending out to a range of about 1 wavelength of energy emitted, away from the read system.

Although the proximity region as defined herein extends beyond the near field region as defined above, the term "far field" will be used herein at times to refer to the region beyond the proximity region where proximity coupling occurs. Thus "far field," as used herein, thus may refer to either beyond the near field or beyond the proximity field (which includes the near field region, but extends farther than the near field region).

Figure 5:
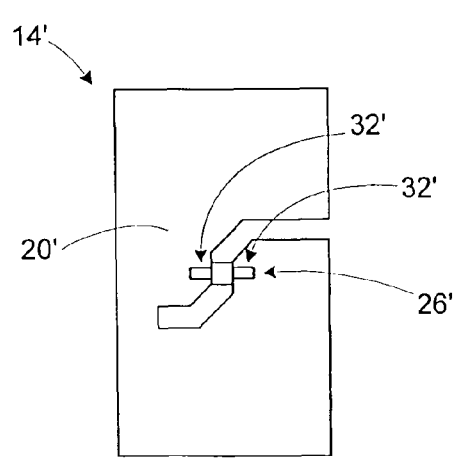
FIG. 5 is a plan view of part of one of the RFID devices on the objects of the stack of FIG. 1, an RFID device which has an antenna configuration that is a mirror image of the antenna configuration of the RFID device of FIG. 3.

FIG. 5 shows an RFID device 14' that has an antenna 20' that is a mirror image of the antenna configuration 20 of the RFID device 14 (FIG. 3). The RFID device 14' has feedpoints 32' that are in the same relative location as the feedpoints 32 of the RFID device 14. Thus the interposers 26 and 26' of the RFID devices 14 and 14' may be placed in the same relative locations on the devices, despite the different antenna configurations of the two devices 14 and 14'. Use of mirror image antenna configurations 20 and 20' provides different routes of locations for the electric and/or magnetic field high-value "hot spots." This reduces the interaction between the devices 14 and 14' when they are overlapped, relative to a situation of overlapping devices having identical antenna configurations.

Figure 6:
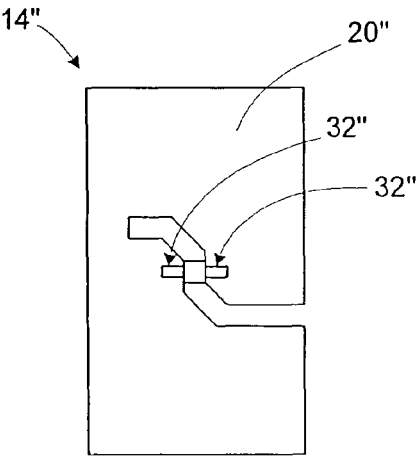
FIG. 6 is a plan view of part of one of the RFID devices on the objects of the stack of FIG. 1, an RFID device which has an antenna configuration that is a rotated version of the antenna configuration of the RFID device of FIG. 3.

FIG. 6 shows another alternate antenna configuration, an antenna configuration 20" that is the same as the antenna configuration 20, but rotated 180°. The feedpoints 32" for the antenna configuration 20" may be in the same relative location as the corresponding feedpoints 32 and 32' for the RFID devices 14 and 14' (FIGS. 3 and 5). It will be appreciated that the RFID device 14" may be different from a mere rotation of the RFID device 14. The devices 14 and 14" may have printed material there upon that relies upon orientation when the devices 14 and 14" are placed on objects 12. Mere rotation of the entire RFID device 14 may result in upside down printed material.

FIG. 7 shows an RFID device 54 with an antenna 60 that differs completely in its configuration from the antenna configuration 20 of the RFID device 14 (FIG. 3). An interposer 66 of the device 54 is coupled to the antenna 60 at feedpoints 72 that may correspond in relative location to the feedpoints 32 of the RFID device 14. FIG. 8 shows an RFID device 74 with yet another configuration for its antenna 80. An interposer 86 of the device 74 is coupled to the antenna 80 at feedpoints 92 that may have the same relative location as that of the feedpoints 32 and 72.

FIG. 9 schematically shows the fields set up by operation of three successive overlapped RFID devices 14a, 14b, and 14c. The near-field magnetic field loops 94a, 94b, and 94c of the RFID devices 14a, 14b, and 14c are in different positions. The high points 96a, 96b, and 96c of the near-field electric fields of the RFID devices 14a, 14b, and 14c may also be in different positions. However, the different positions for the high points 96a, 96b, and 96c may not have any substantially impact on the far field readability of the RFID devices 14a, 14b, and 14c. That is, the effect of the variations in the position of the near-field electric field behavior of the RFID devices 14a, 14b, and 14c may be insubstantial. However, the difference in positions for the magnetic field loops 94a, 94b, and 94c may significantly reduce the undesirable near-field interaction between the RFID devices 14a, 14b, and 14c.

Figure 10:
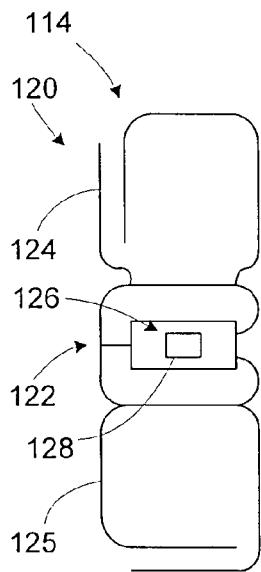
FIG. 10 is a plan view of another possible antenna configuration for one of the RFID devices on the objects of the stack of FIG. 1.
Figure 11:
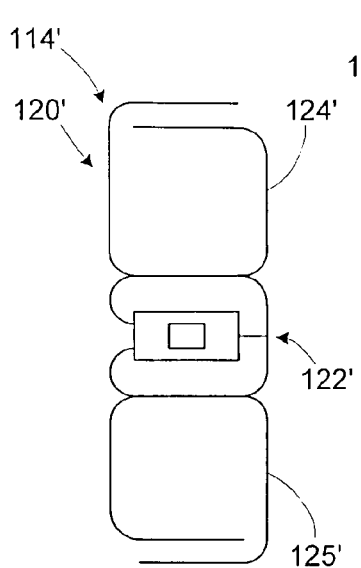
FIG. 11 is a plan view of yet another possible antenna configuration for one of the RFID devices on the objects of the stack of FIG. 1.
Figure 12:
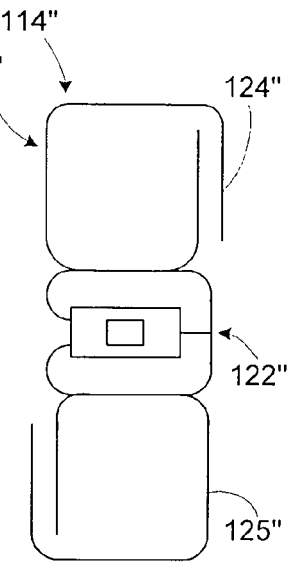
FIG. 12 is a plan view of still another possible antenna configuration for one of the RFID devices on the objects of the stack of FIG. 1.

With reference now to FIG. 10, an RFID device 114 includes an interposer or strap 126 has a chip 128 that is coupled to an antenna configuration 120 that includes an antenna central portion 122 and multiple antenna end portions 124 and 125. The antenna end portions 124 and 125 are coupled to different inputs of the chip 128, and may both be used simultaneously for communication involving the RFID device 114. The antenna end portions 124 and 125 may each have different configurations, and correspondingly placed end portions of different RFID devices may have different configurations. The RFID devices 114' and 114", shown in FIGS. 11 and 12, have alternative antenna configurations 120' and 120" with different end portions 124' and 124" from those for the end portion 124 of the device 114. The end portions 125' and 125" may have the same or different configuration from that of the end portion 125. In addition, the configuration of antenna central portions 122' and 122" may be different from that of the antenna central portion 122. For example, one or both of the antenna central portions 122' and 122" may be a mirror image of the antenna central portion 122.

In order to reduce the near-field interaction, it may be sufficient for adjacent devices to have a different configuration in one of the antenna end portions or antenna central portion. In the illustrated embodiment there are eighteen possible antenna configurations, with three independent configurations for each of the antenna end portions, and two configurations for the antenna central portion. The large number of possible configurations reduces the chance that randomly-selected adjacent devices will have undesirable near-field interactions with one another. It will be appreciated that a greater or lesser number of antenna possible antenna configurations may be utilized.

Figure 13:
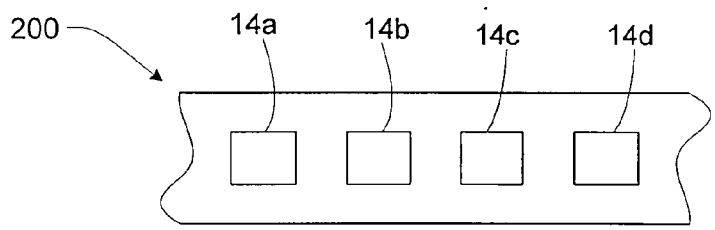
FIG. 13 is a plan view of a web or sheet of RFID devices in accordance with an embodiment of the present invention.

RFID devices with the various antenna configurations shown in FIGS. 3 and 5-12 may be formed on a web or sheet 200, such as shown in FIG. 13. RFID devices 14a-14d from the web or sheet 200 may be singulated, physically separated from the web or sheet 200 such as by cutting, and mechanically coupled to successive objects 12 (FIG. 1), which are then stacked to form the stack 10 (FIG. 1). The web or sheet 100 may be configured such that successive of the RFID devices 14a-14d have non-identical antenna configurations. The antenna configurations of adjacent devices of the web or sheet 200 may be mirror images of one another, may be rotated relative to one another, or may have other non-mirror-image and non-rotation differences in antenna configuration. The use of different antenna configurations and successive RFID devices, and on successive overlapped objects, may reduce undesirable near-field interactions between the RFID devices. Reducing these near-field interactions may improve the readability of the RFID devices in the far field.

Figure 14:
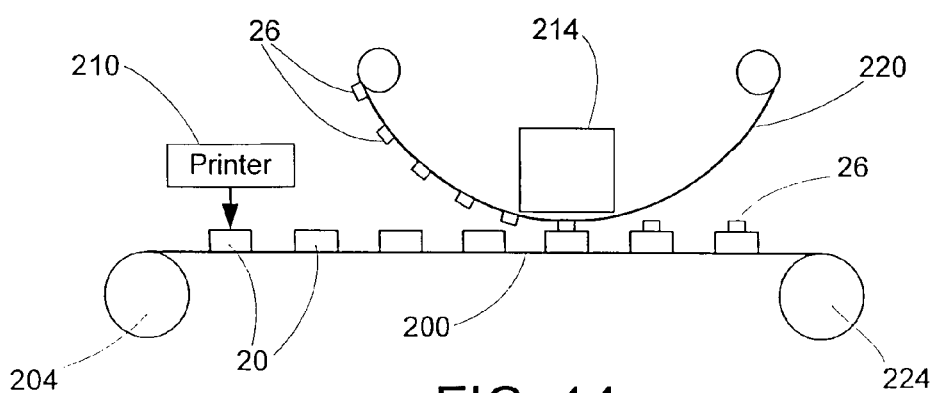
FIG. 14 is a schematic view of a system and process for making the web or sheet of FIG. 13.

FIG. 14 illustrates a roll-to-roll process for forming a web 200 of RFID devices. The web 200 begins at a supply roll 204. Antennas are deposited on the web 200 using an antenna formation device such as a printer 210. A placing device 214 is then used to place interposers 26 at the feedpoints of the antennas 20. The interposers 26 may be placed from an interposer web 220. Finally, the web 200 is wound up on a take-up roll 224.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A radio frequency identification (RFID) device web or sheet comprises:
    multiple RFID devices,
        wherein each of the RFID devices has an antenna-receiving position at the same relative location; and
        wherein adjacent of the RFID devices include different antenna configurations from one another to reduce near field interaction and each antenna configuration substantially fills the antenna-receiving positions.

2. The web or sheet of claim 1, wherein all of the antenna configurations have the same relative feedpoint location for feed points for coupling interposers of the RFID devices to the antenna configurations.

3. The web or sheet of claim 1, wherein the different antenna configurations are substantially mirror images of one another.

4. The web or sheet of claim 1, wherein one of the different antenna configurations is a rotated version of another of the different antenna configurations.

5. The web or sheet of claim 1, wherein one of the different antenna configurations is neither a rotated version nor a mirror image version of the another of the different antenna configurations.

6. The web or sheet of claim 1,
    wherein the RFID devices include respective chips coupled to the respective antenna configurations;
    wherein each of the antenna configurations includes multiple antenna end portions coupled to respective inputs of the chips; and
    wherein the different end portions differ from one another in configuration of at least one of the end portions.

7. A grouping of objects comprising:
    multiple of the objects that overlap one another;
    wherein respective radio frequency identification (RFID) devices are mechanically coupled to the objects;
    wherein the RFID devices directly overlap one another; and
    wherein at least some of the RFID devices have different antenna configurations than other of the RFID devices to reduce near field interaction and each antenna configuration substantially fills the antenna receiving portions.

8. The grouping of claim 7, wherein the objects are stacked, being substantially aligned in their overlapping.

9. The grouping of claim 8, wherein the RFID devices are stacked, being substantially aligned in their overlapping.

10. The grouping of claim 7, wherein all of the antenna configurations have the same relative feedpoint location for feed points for coupling interposers of the RFID devices to the antenna configurations.

11. A method of identifying a plurality of objects, wherein the method comprises:
    placing respective radio frequency identification (RFID) devices on the objects; and
    aligning the objects in an overlapping configuration;
        wherein the aligning causes the RFID devices to overlap each other and have an antenna receiving position at the same relative location as an adjacent RFID device; and
        wherein adjacent of the overlapped RFID devices have different antenna configurations from one another to reduce near field interaction.

12. The method of claim 11, wherein the aligning includes stacking the objects one on another.

13. The method of claim 11, wherein the placing includes placing the RFID devices at the same relative location on all of the objects.

14. The method of claim 11, wherein all of the RFID devices have the same relative antenna location for their respective antenna configurations.

15. The method of claim 11, wherein all of the antenna configurations have the same relative feed point location for feed points for coupling interposers of the RFID devices to the antenna configurations.

16. The method of claim 11, wherein the different antenna configurations are substantially mirror images of one another.

17. The method of claim 11, wherein one of the different antenna configurations is a rotated version of another of the different antenna configurations.

18. The method of claim 11, wherein one of the different antenna configurations is neither a rotated version nor a mirror image version of the another of the different antenna configurations.

19. The method of claim 11, wherein the placing includes taking the RFID devices from a web or sheet of RFID devices.

20. The method of claim 19, wherein adjacent of the RFID devices on the web or sheet have the different antenna configurations.

* * * * *